United States Patent
Buehl et al.

(10) Patent No.: US 10,182,047 B1
(45) Date of Patent: Jan. 15, 2019

(54) PICTOGRAPH PASSWORD SECURITY SYSTEM

(71) Applicant: Snap Inc., Santa Monica, CA (US)

(72) Inventors: Eric Buehl, Venice, CA (US); Michael Cieslak, Venice, CA (US)

(73) Assignee: Snap Inc., Santa Monica, CA (US)

( * ) Notice: Subject to any disclaimer, the term of this patent is extended or adjusted under 35 U.S.C. 154(b) by 83 days.

(21) Appl. No.: 15/199,463

(22) Filed: Jun. 30, 2016

(51) Int. Cl.
| | |
|---|---|
| H04L 29/06 | (2006.01) |
| H04L 12/58 | (2006.01) |
| G06F 3/0481 | (2013.01) |
| G06F 3/0488 | (2013.01) |
| G06F 17/24 | (2006.01) |
| G06F 3/0484 | (2013.01) |

(52) U.S. Cl.
CPC ........ *H04L 63/083* (2013.01); *G06F 3/04817* (2013.01); *G06F 3/04842* (2013.01); *G06F 3/04886* (2013.01); *G06F 17/248* (2013.01); *H04L 51/10* (2013.01)

(58) Field of Classification Search
CPC .................................................. H04L 63/083
See application file for complete search history.

(56) References Cited

U.S. PATENT DOCUMENTS

| | | | |
|---|---|---|---|
| 5,754,939 | A | 5/1998 | Herz et al. |
| 6,038,295 | A | 3/2000 | Mattes |
| 6,158,044 | A | 12/2000 | Tibbetts |
| 6,167,435 | A | 12/2000 | Druckenmiller et al. |
| 6,205,432 | B1 | 3/2001 | Gabbard et al. |
| 6,310,694 | B1 | 10/2001 | Okimoto et al. |
| 6,484,196 | B1 | 11/2002 | Maurille |
| 6,487,586 | B2 | 11/2002 | Ogilvie et al. |

(Continued)

FOREIGN PATENT DOCUMENTS

| | | |
|---|---|---|
| CA | 2887596 A1 | 7/2015 |
| CN | 102880398 | 1/2013 |

(Continued)

OTHER PUBLICATIONS

Jansen, Wayne, "Picture Password: A Visual Login Technique for Mobile Devices", National Institute of Standards and Technology, NISTIR 7030, (Jul. 2003), 20 pgs.

Castelluccia, Claude, et al., "EphPub: Toward robust Ephemeral Publishing", 19th IEEE International Conference on Network Protocols (ICNP), (Oct. 17, 2011), 18 pgs.

(Continued)

*Primary Examiner* — Jason K Gee
(74) *Attorney, Agent, or Firm* — Schwegman Lundberg & Woessner, P.A.

(57) ABSTRACT

Systems and methods for determining a pictograph password sequence and association phrase are provided. In some example embodiments, an assigned pictograph sequence request is received from a client device, with the request causing the system to generate a template pictograph sequence, generate an association phrase based on the template pictograph sequence, store the template pictograph sequence and associated phrase on a memory, and transmit instructions to cause a display of the template pictograph sequence and the association phrase. In some example embodiments, the system requires an input of a pictograph sequence that matches the template pictograph sequence in order for a user to view content. In some example embodiments, the template pictograph sequence may be replaced by a user pictograph sequence.

20 Claims, 12 Drawing Sheets

(56) References Cited

U.S. PATENT DOCUMENTS

| | | |
|---|---|---|
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,255,810 B2 | 8/2012 | Moore et al. |
| 8,312,097 B1 | 11/2012 | Siegel et al. |
| 8,332,475 B2 | 12/2012 | Rosen et al. |
| 8,458,485 B2 | 6/2013 | Bandyopadhyay et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,213,824 B2 | 12/2015 | Lee |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,565,175 B1 * | 2/2017 | Saylor ................... G06F 21/10 |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0016796 A1 * | 1/2007 | Singhal ................... G06Q 20/32 713/183 |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0121489 A1 * | 4/2015 | Yang ...................... G06F 21/36 726/6 |
| 2015/0199082 A1 | 7/2015 | Scholler et al. |
| 2015/0227602 A1 | 8/2015 | Ramu et al. |
| 2015/0281216 A1 * | 10/2015 | Donohue ............... H04L 63/083 713/171 |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |

(56) References Cited

U.S. PATENT DOCUMENTS

| | | |
|---|---|---|
| 2017/0295250 A1 | 10/2017 | Samaranayake et al. |
| 2017/0374003 A1 | 12/2017 | Allen et al. |
| 2017/0374508 A1 | 12/2017 | Davis et al. |

FOREIGN PATENT DOCUMENTS

| | | |
|---|---|---|
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", URL: http://www.theregister.co.uk/2005/12/12/stealthtext/, (Dec. 12, 2005), 1 pg.

Melanson, Mike, "This text message will self destruct in 60 seconds", URL: http://readwrite.com/2011/02/11/this_text_message_will_self_destruct_in_60_seconds, (Feb. 18, 2015), 4 pgs.

Sawers, Paul, "Snapchat for iOS Lets You Send Photos to Friends and Set How long They're Visible for", URL: https://thenextweb.com/apps/2012/05/07/snapchat-for-ios-lets-you-send-photos-to-friends-and-set-how-long-theyre-visible-for/, (May 7, 2012), 5 pgs.

Shein, Esther, "Ephemeral Data", Communications of the ACM, vol. 56, No. 9, (Sep. 2013), 20-22.

Vaas, Lisa, "StealthText, Should You Choose to Accept It", URL: http://www.eweek.com/print/c/a/MessagingandCollaboration/StealthTextShouldYouChoosetoAcceptIt, (Dec. 13, 2005), 2 pgs.

* cited by examiner

PICTOGRAPH PASSWORD SECURITY SYSTEM

TECHNICAL FIELD

Embodiments of the present disclosure relate generally to mobile computing technology and, more particularly, but not by way of limitation, to a pictograph (or, e.g., an emoji) password security system.

BACKGROUND

In recent years, mobile devices, wearable devices, smart devices, and the like have pervaded nearly every aspect of modern life. Emojis are a popular form of expression in digital communications. As a result of this popularity, there is an ever-increasing variety of emojis for a wide variety of expressions.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
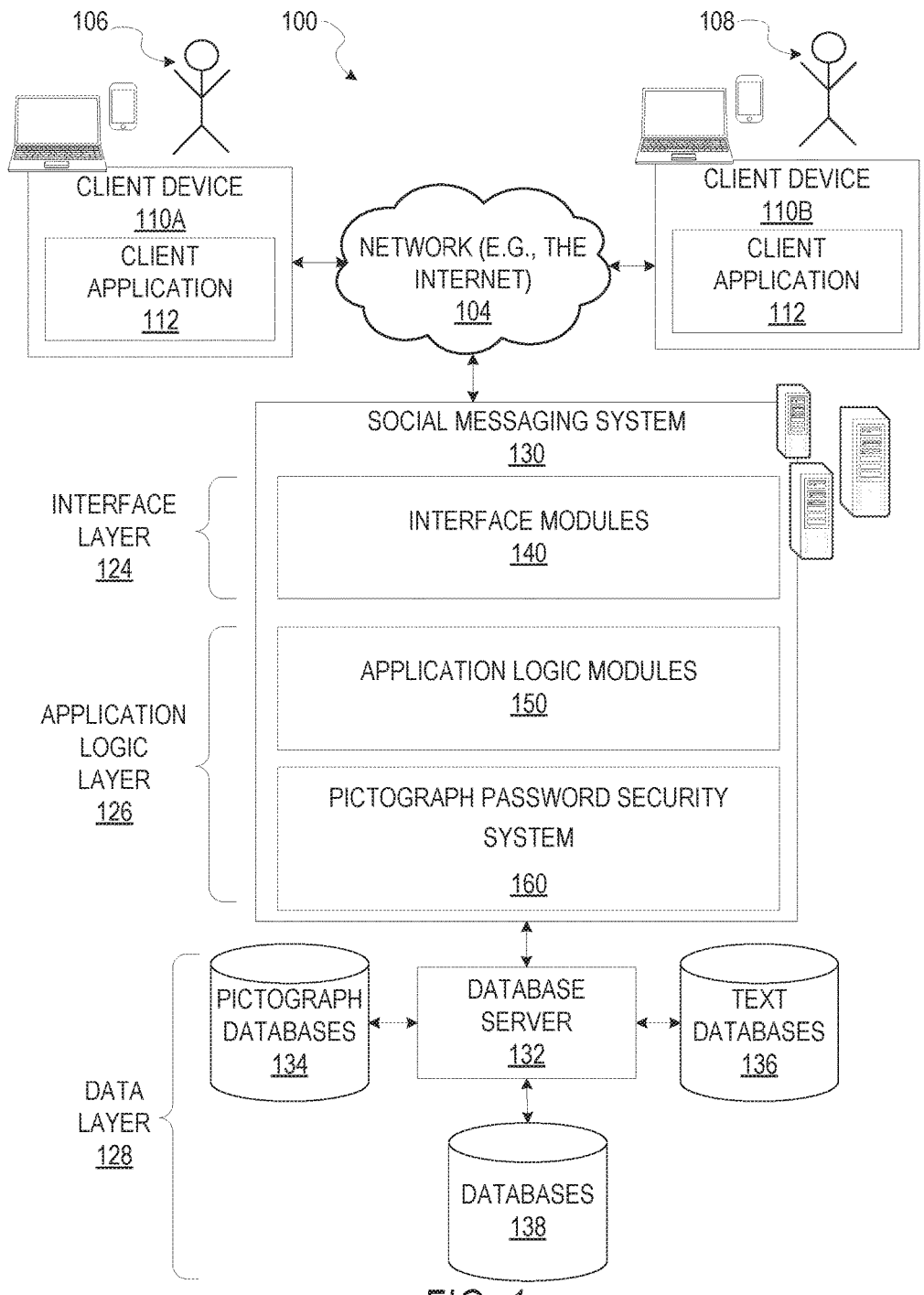
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Some embodiments provide improved security through the use of pictograph based passwords, allowing a user to access content on a client application by pressing a series of pictographs. Some embodiments contemplate the use of emojis as the pictographs. In other embodiments, other forms of pictographs may be used. Further, some embodiments may assist a user in generating a pictograph password that is both complex and memorable. In various example embodiments, to enhance security measures on mobile devices and applications, a template pictograph sequence is generated that can later be selected from a plurality of pictographs to gain access to content. Further, to help a user memorize the template pictograph sequence, the user is provided with an association phrase that is generated based on the template pictograph sequence. A pictograph password security system generates the template pictograph sequence and association phrase by receiving a request from a user interacting with a first client device for a pictograph sequence, accessing a first database containing a plurality of pictographs, generating a template pictograph sequence, accessing a second database that contains words and phrases, determining an association phrase based on the template pictograph sequence, storing the template pictograph sequence on a memory, and transmitting instructions that cause a display of the template pictograph sequence and the association phrase. In some example embodiments, the association phrase is stored on a memory accessible by the user. For example, after failing to input the template entering the template password sequence, the user may access the association phrase as a hint to remember the template pictograph sequence.

In additional example embodiments, the pictograph password security system also allows a user to input a user pictograph sequence input to replace the template pictograph sequence. In this embodiment, the pictograph password security system further compares the user pictograph sequence input to a complexity threshold and removes the user pictograph sequence input if the complexity threshold is not transgressed. In additional example embodiments, the pictograph password security system generates one or more pictographs to be added to an alphanumeric password inputted by the user to replace the template pictograph sequence. In additional example embodiments, the pictograph password security system allows the user to provide a user combined sequence input that includes both alphanumeric symbols and pictographs to replace the template pictograph sequence.

In additional example embodiments, the pictograph password security system further allows a user to request a replacement template pictograph sequence and association phrase, and provide the user with a second template pictograph sequence and a second association phrase. In additional example embodiments, a user inputs a user association phrase input and receives a customized pictograph sequence based on words and phrases included in the user association phrase input.

In additional example embodiments, the pictograph password template is included in the metadata message and requires a receiving user to input a pictograph sequence that matches the template pictograph sequence in order to access the message. The message further includes a deletion trigger that causes the message to self-delete after a certain event, such as a user viewing the message or after a predetermined length of time.

FIG. 1 is a network diagram depicting a network system 100 having a client-server architecture configured for exchanging data over a network, according to one embodiment. For example, the network system 100 may be a messaging system where clients communicate and exchange data within the network system 100. In this example, the data pertains to various functions (e.g., sending and receiving text and media communication, determining geolocation, etc.) and aspects (e.g., pictograph password generation) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface module(s) (e.g., a web server) 140, which receive requests from various client-computing devices and servers, such as client devices 110A and 110B executing client application(s) 112. In response to received requests, the interface module(s) 140 communicate appropriate responses to requesting devices via a network 104. For example, the interface module(s) 140 can receive requests such as Hypertext Transfer Protocol (HTTP) requests, or other web-based Application Programming Interface (API) requests.

The client devices 110A and 110B can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110A and 110B are executing the client application(s) 112. The client application(s) 112 can provide functionality to present information to a user 106 and communicate via the network 104 to exchange information with the social messaging system 130. Each of the client devices 110A and 110B can comprise a computing device that includes at least a display and communication capabilities with the network 104 to access the social messaging system 130. The client devices 110A and 110B comprise, but are not limited to, remote devices, work stations, computers, general purpose computers. Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. Users 106 and 108 can be a person, a machine, or other means of interacting with the client devices 110A and 110B. In some embodiments, the user(s) 106 interact with the social messaging system 130 via the client devices 110A and 110B.

As shown in FIG. 1, the data layer 128 has database server(s) 132 that facilitate access to information storage repositories or data structures (e.g. databases), such as one or more pictograph databases 134, one or more text databases 136, or one or more other databases 138. The databases 134-138 may further include various forms of information storage repositories such as data tables. These databases are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client devices 110A and 110B to send and receive messages that include text and media content such as pictures and video. The client devices 110A and 110B may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module(s) 150.

As illustrated in FIG. 1, the social messaging system 130 includes a pictograph password security system 160. In various embodiments, the pictograph password security system 160 can be implemented as a standalone system and is not necessarily included in the social messaging system 130. In some embodiments, the client devices 110A and 110B include a portion of the pictograph passwords security system 160 (e.g., a portion of the pictograph password security system 160 included independently or in the client application(s) 112). In embodiments where the client devices 110A and 110B includes a portion of the pictograph password security system 160, the client devices 110A and 110B can work alone or in conjunction with the portion of the pictograph password security system 160 included in a particular application server or included in the social messaging system 130.

Figure 2:
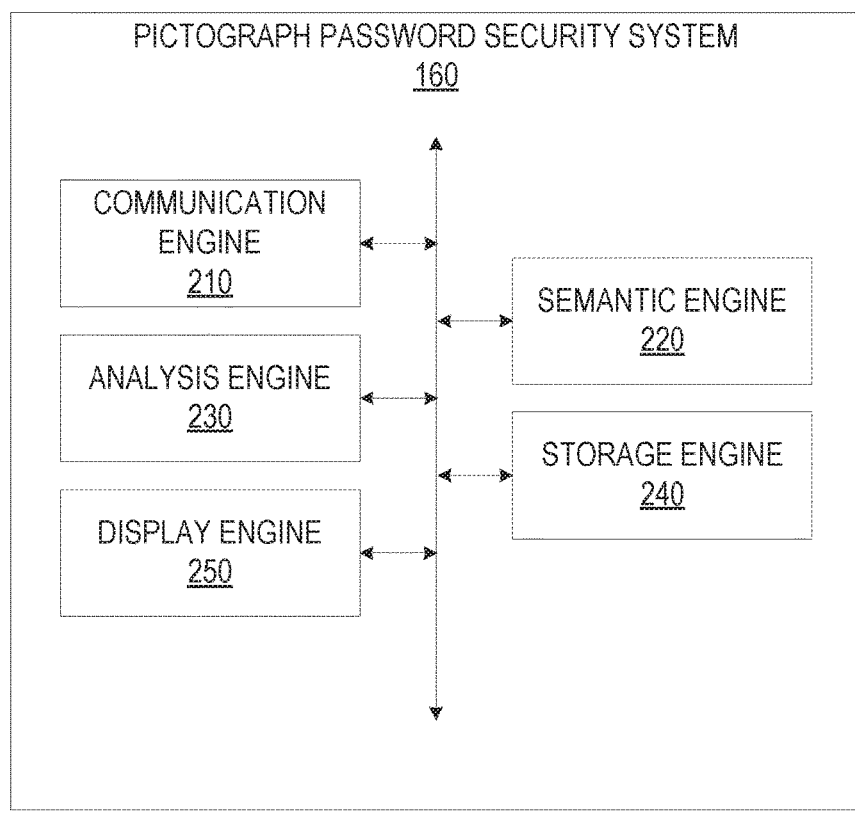
FIG. 2 is a block diagram illustrating an example embodiment of a pictograph password security system, according to some example embodiments.

FIG. 2 is a block diagram 200 of the pictograph password security system 160. The pictograph password security system 160 is shown to include a communication engine 210, a semantic engine 220, an analysis engine 230, a storage engine 240, and a display engine 250. All, or some, of the engines 210-250 communicate with each other, for example, via a network coupling, shared memory, and the like. Each engine can be implemented as a single engine, combined into other engines, or further subdivided into multiple engines. Other engines not pertinent to example embodiments can also be included, but are not shown.

The communication engine 210 provides various communications functionality. For example, the communication engine 210 receives communications from the first client device 110A over the network 104 and through the social messaging system 130. In some example embodiments, these communications include a request for the pictograph password security system to generate a template pictograph sequence and an association phrase for that sequence. The communication engine 210 can also access various data structures that store information, including the text database 136 and the pictograph database 134. Within each data structure, the communication engine 210 can retrieve a selection of pictographs or text. Additionally, the communication engine 210 can access data structures storing pictographs or text within the first client device 110A and the second client device 110B and can facilitate communications and data transfer with other client devices such as the second client device 110B.

The semantic engine 220 provides various text and pictograph generation functionality. In example embodiments, the text and pictograph functionality includes generating a template pictograph sequence based on randomly selected pictographs from the pictograph database 134 or an association phrase based on words and phrases within the text database 136 that are associated with the selected pictographs. In some example embodiments, the semantic engine 220 can further determine pictographs from the pictograph database 134 that are similar to words and phrases in a user association phrase input received from the client device and generate a customized pictograph sequence based on the words and phrases.

The analysis engine 230 provides functionality to compare a pictograph input to a pictograph sequence stored on the memory and determine whether the sequences are the same. In example embodiments, a first user 106 inputs a pictograph sequence on a user interface of the first client device 110A in order to access locked content, such as features on a client application 112 running on the first client device 110A. In this embodiment, the analysis engine 230 compares the pictograph sequence input to the pictograph sequence stored on the memory to determine if the sequences match. In some example embodiments, a second user 108 attempts to access content, such as a message, on the second client device 110B by inputting a pictograph sequence input, and the analysis engine 230 can determine whether or not the pictograph sequence input matches the pictograph sequence stored on the memory to facilitate secure access to the message.

The storage engine 240 provides various functionality to store pictograph sequences, such as the template pictograph sequence, on a memory. In some example embodiments, the storage engine stores a template pictograph sequence generated by the semantic engine 220 on the memory. In some example embodiments, responsive to the communication engine 210 receiving a user pictograph sequence input, the storage engine 240 removes the template pictograph sequence from the memory and replaces it with a user pictograph sequence derived from the user pictograph sequence input.

The display engine 250 provides various functionality to transmit instructions to generate displays on the first client device 110A or the second client device 110B. In some example embodiments, the display engine 250 transmits instructions to cause a display of the template pictograph sequence generated by the semantic engine 220 and stored on the memory by the storage engine 240 to the first client device 110A along with the association phrase generated by the semantic engine 220. In some example embodiments, the display engine 250 transmits instructions to cause a display of a pictograph keyboard that includes a plurality of selectable pictographs to the first client device 110A, with the pictograph keyboard viewable on a user interface using the client application 112.

Figure 3:
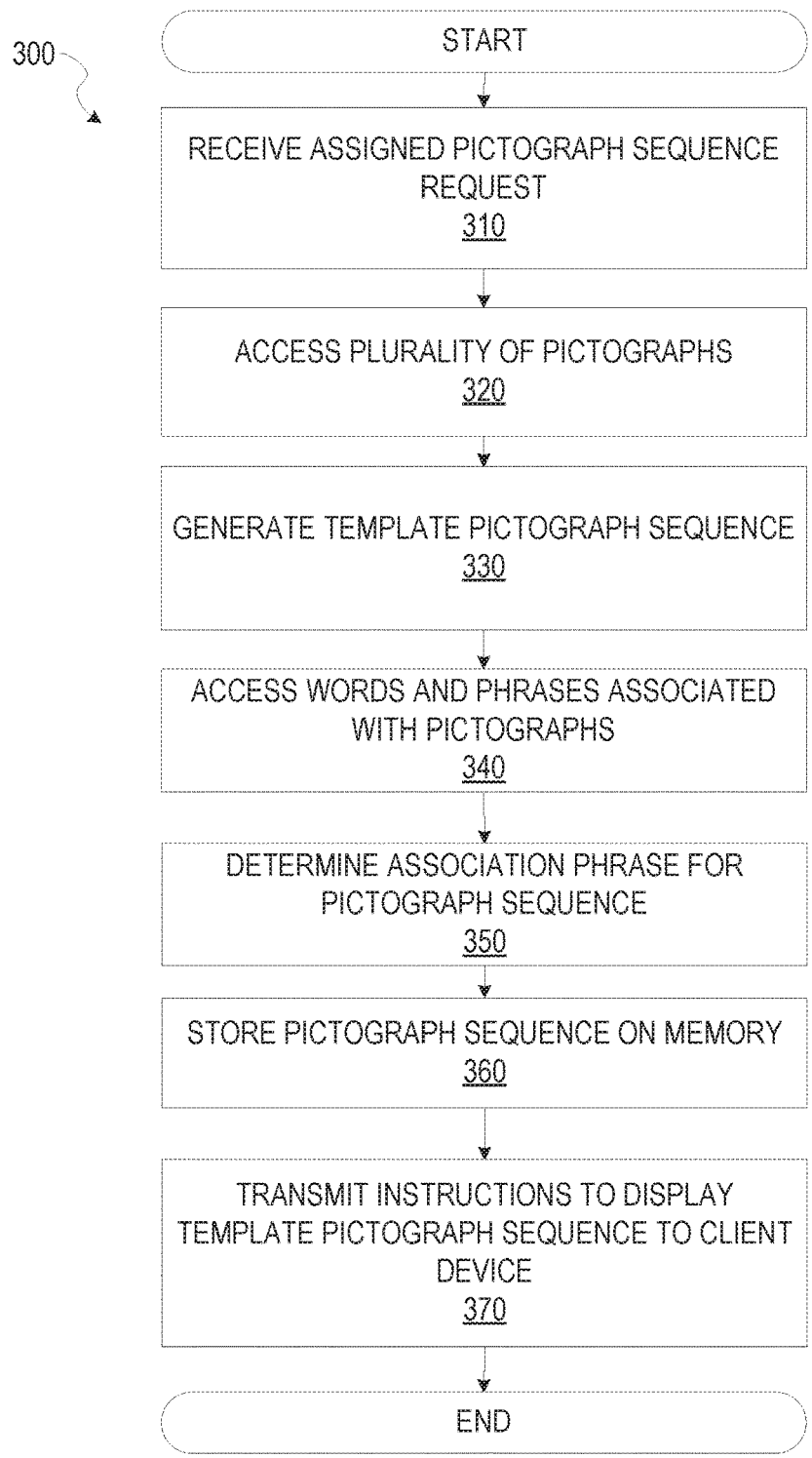
FIG. 3 is a flow diagram illustrating an example method of generating a template pictograph sequence and association phrase, according to some example embodiments.

FIG. 3 is a flow diagram illustrating an example method 300 for generating a template pictograph sequence and association phrase. The operations of the method 300 may be performed by components of the pictograph password security system 160, and are so described below for the purposes of illustration.

At operation 310, the communication engine 210 receives, from the first client device 110A and over the network 104, an assigned pictograph sequence request from a first user 106. The assigned pictograph sequence request is a request by the first user 106 or by the first client device 110A requesting that the client application 112 generate a unique sequence of pictographs that will be needed for the user to access content or access features on the client device 110A or on the client application 112.

In example embodiments, the first user 106 can submit the assigned pictograph sequence request from the first client device 110A by selecting an icon on the client application 112. The first user 106 may alternatively be prompted by the client application 112 to create an assigned pictograph sequence request. For example, the first user 106 may not currently have a security setting (e.g. password, fingerprint identification) that requires an input of a password to access the client application 112 on the first client device 110A. In the example, client application 112 generates a notification window on a graphic user interface on the client device 110A that prompts the user to submit an assigned pictograph sequence request in order to have the client application 112 secured by a password security feature in the future. In some example embodiments, the pictograph sequence may include text, numbers, symbols, etc., in addition to pictographs.

At operation 320, the communication engine 210 accesses a plurality of pictographs from one or more of the pictograph databases 134 using the database server 132. The plurality of pictographs may include any illustrations, words, symbols, or numerals that are displayable on the first client device 110A to the first user 106. In some example embodiments, the communication accesses the plurality of pictographs from a data structure located on the first client device 110A, such as within the memory of the first client device 110A.

At operation 330, the semantic engine 220 generates a template pictograph sequence using pictographs randomly selected by the communication engine 210 from the one or more pictograph databases 134 accessed by the communication engine to 210 over the database server 132. In some example embodiments, the semantic engine 220 employs certain rules to control the generation of pictographs. For example, the semantic engine 220 avoids selecting the same pictograph to appear twice in the template pictograph sequence. In another example, the semantic engine 220 avoids selecting multiple pictographs having the same color in order to make a template pictograph sequence more visually appealing.

In some example embodiments, the assigned pictograph sequence request is an assigned pictograph addition request that requests one or more pictographs to be added to a user-inputted alphanumeric password. In this embodiment, the semantic engine 220 selects one or more randomly selects one or pictographs from the one or more pictograph databases 134 accessed by the communication engine 210 to create a template combined sequence.

At operation 340, the communication engine 210, responsive to the semantic engine 220 generating a template pictograph sequence, accesses the text database 136 over the database server 132 and retrieves words and phrases associated with the pictographs included in the template pictograph sequence. Each pictograph is associated with at least one word or with at least one phrase. For example, a raindrop pictograph is be associated with the word "water," with the word "rain," with the phrase "rainy weather," or with the phrase "get wet." Thus, the communication engine 210 would aggregate each word and each phrase associated with each of the pictographs in the template pictograph sequence.

In some example embodiments, the communication engine 210 matches a pictograph indicator located within the data of a pictograph within the template pictograph sequence with a text indicator located within the data of a word or a phrase located on the text database 136. In this embodiment, each pictograph in the template pictograph sequence would thus be matched with at least one word or phrase from the text database basics.

At operation 350, the semantic engine 220 determines an association phrase for the pictograph sequence based on the words and phrases associated with each of the pictographs within the template pictograph sequence along with the order of the pictographs and the sequence. The semantic engine 220 begins with the first pictograph in the template pictograph sequence and associates a first word or phrase with that pictograph. The first word or phrase becomes the beginning of the association phrase. In an example embodiment, the first word or phrase is chosen randomly or based on the other pictographs in the template pictograph sequence. The semantic engine then selects a second word or phrase associated with the second pictograph in the template pictograph sequence. The semantic engine 220 selects the second word or phrase based on the coherence of the association phrase when the second word or phrase is recited after the first word or phrase. In the same way, the semantic engine 220 selects a third word or phrase based on coherence of the association phrase when the third word or phrase is recited after the first and the second words or phrases. The sequence continues until the semantic engine 220 selects the final word or phrase for the last pictograph in the template pictograph sequence.

In some embodiments, the semantic engine 220 uses a coherence score to determine which word or phrase associated with one of the pictographs in the template pictograph sequence to include in the association phrase. The coherence score is based, in part, on a grammatical designation of a word or phrase (e.g. noun, verb, prepositional phrase). For example, the coherence score of a verb following a prepositional phrase may be low (e.g. 0.28/1) whereas the coherence score of a verb following a noun may be high (e.g. 0.72/1).

The coherence score may also be based, in part, on the frequency that the words or phrases that the semantic engine 220 is using to build the association phrase appear together and in the order of the association phrase. In order to determine frequency, the communication engine can, for example, access a plurality of phrases located in at least one text database 136 that includes words or phrases associated with the pictographs in the template pictograph sequence. The semantic engine 220 can then determine which words or phrases appear together and in a certain order frequently based on the plurality of phrases and thus which words or phrases are likely more coherent when recited together. For example, the gerund "watching" may, according to the plurality of phrases, occur substantially more frequently before the noun "television" compared to the noun "chair." Similarly as above, the higher frequency could correlate to a high coherence score and a lower frequency could correlate to a lower coherence score.

At operation 360, the storage engine 240 stores the template pictograph sequence on a memory. In example embodiments, the memory is located on the first client device 110A or on a database such as database 138 accessible by the social messaging system 130 over the network 104. In other example embodiments, the memory is located on other third-party systems connected to the social messaging system 130 over the network 104.

At operation 370, responsive to the semantic engine 220 determining the association phrase, the display engine 250 transmits instructions to cause a display of the template pictograph sequence and of the association phrase to the first client device 110A. The template pictograph sequence in the association phrase is further viewable to the first user 106 over a user interface and is part of the client application 112.

For example, the first user 106 may submit an assigned pictograph sequence request using the first client device 110A with the intention of password-protecting the client application 112 on the first client device 110A. The communication engine 210 receives the assigned pictograph sequence request and accesses the plurality of pictographs available in the pictograph database 134. The semantic engine 220 then randomly selects, from the pictographs available in the pictograph database 134, four pictographs that comprise a template pictograph sequence. In this example, the sequence comprises: first, a pictograph of a microscope; second, a pictograph of a movie clapperboard, third, a pictograph of a smiling face wearing sunglasses, and fourth, a pictograph of the crescent moon. Responsive to the semantic engine 220 generating the template pictograph sequence, the communication engine 210 accesses a text database 136 that contains words and phrases associated with the microscope pictograph, the clapper board pictograph, the sunglass face pictograph, and the moon pictograph.

The semantic engine 220 then selects words and phrases from the text database 136 accessed by the communication engine 210 to form an association phrase for the template pictograph sequence. The selection is based on the order of the pictographs such that words or phrases associated with pictographs early in the sequence will appear earlier in the association phrase and words or phrases associated with pictographs toward the end of the sequence will appear toward the end of the association phrase. Further the selection may be based on a coherence score that determines words and phrases based on grammatical structure or the relationship to other words and phrases. Here, the semantic engine 220 associates the word "science" with the microscope pictograph, the word "movies" with the clapperboard pictograph, the word "cool" with the sunglass face pictograph, and the phrase "at night" with the moon pictograph. The semantic engine additionally adds other words to the association phrase in order to improve the coherence score. In this example, the semantic engine generates the phrase "science fiction movies are cool at night." thereby adding the words "fiction" and "are" in order to provide the first user 106 with a coherent phrase. The storage engine 240 stores both the template pictograph sequence and the association phrase on a memory such as the memory in the first client device 106. Finally, the display engine 250 generates a display that includes the template pictograph sequence and association phrase and transmits instructions to cause the display over the network 104 to the first user 106 such that the user can view the template pictograph sequence on the first client device 110A.

Figure 4:
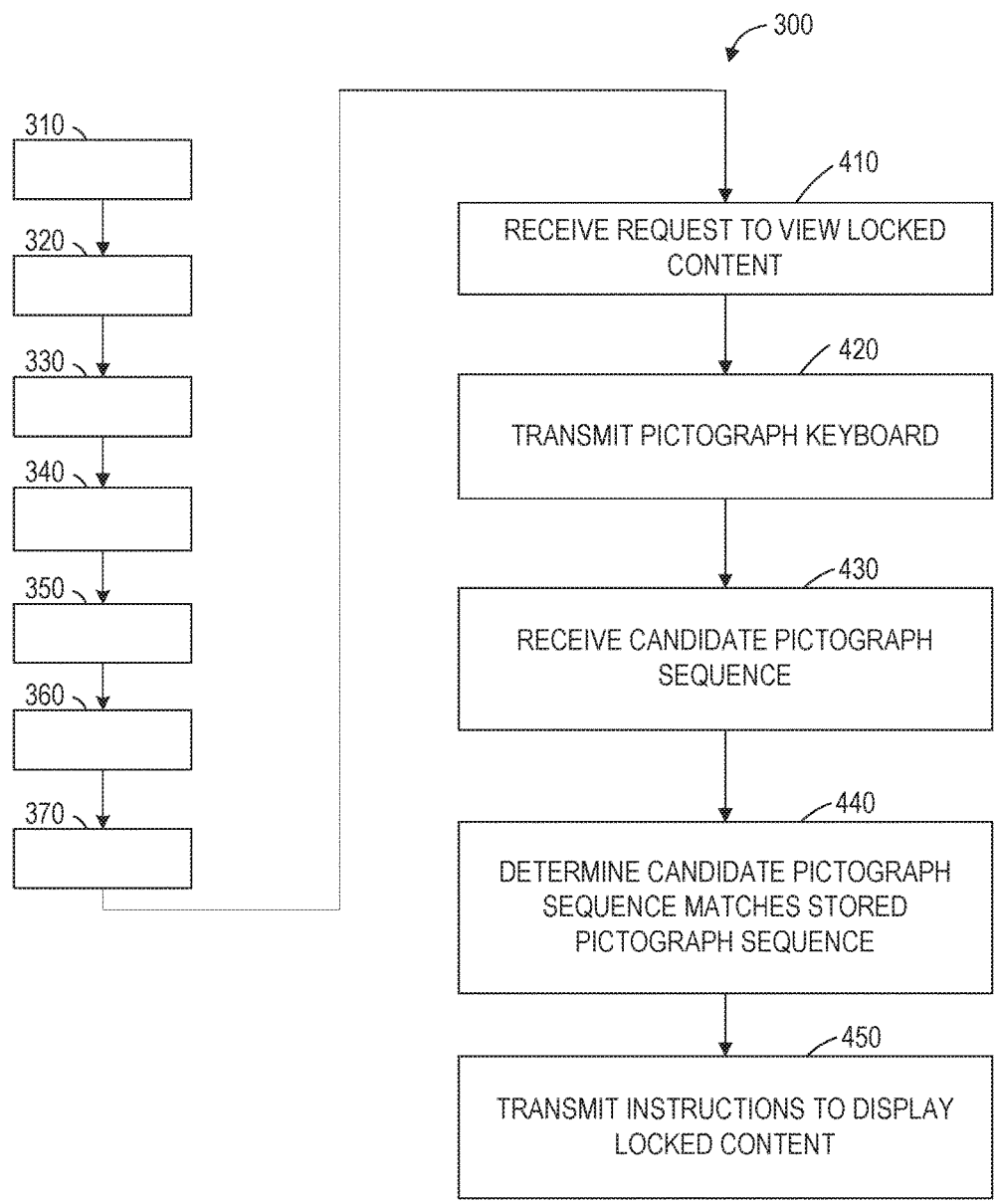
FIG. 4 is a flow diagram illustrating further example operations for generating a template pictograph sequence and association phrase, according to some example embodiments.

FIGS. 4-8 are flowcharts illustrating additional operations of the pictograph password security system 160, according to some example embodiments. In some example embodiments, the method 300 includes additional sub-operations occurring after operation 370. For example, the method 300 may include operations 410-450 as depicted in FIG. 4. In some example embodiments, operations 410-450 included in the method 300 may be performed as part (e.g., a precursor task, a subroutine, or a portion) of or subsequent to operation 370 of method 300, in which the display engine 250 displays the template pictograph sequence and the association phrase on the client application 112 on the first client device 110A.

At operation 410, the communication engine 210 receives a request from the first client device 110A to view content that has been locked by the first user 106 using a pictograph sequence. The communication 210 may receive this request from the client application 112 on the client device 110A over the network 104. For example, the first user 106 may have requested a template pictograph sequence that is now stored on the memory by the storage engine 240.

At operation 420, the display engine 250, responsive to the communication engine 210 receiving the request to view locked content, transmits instructions to cause the display of a pictograph keyboard that includes a plurality of pictographs. In an example embodiment, the display engine 250 transmits instructions to cause the display to the first client device 110A, the display viewable as part of the client application 112 on a user interface of the client device 110A. In this example, the pictographs displayed on the user interface are selectable such that a user can construct a sequence of pictographs by selecting them in a particular order.

At operation 430, the communication engine 210 receives a candidate pictograph sequence from the first client device 110A, with the candidate pictograph sequence comprising a sequence of pictographs selected from the pictograph keyboard displayed on a user interface of the client device 110A. The communication engine 210 may receive the candidate pictograph sequence over the network 104 through the social messaging system 130.

At operation 440, responsive to the communication engine 210 receiving the candidate pictograph sequence, the analysis engine 230 determines whether the candidate pictograph sequence matches a pictograph sequence stored on the memory. For example, the candidate pictograph sequence could be the same pictographs as the template pictograph sequence that is stored in a memory, and the pictographs within the candidate pictograph sequence could be in the same order as the template pictograph sequence.

In an example embodiment, the analysis engine 230 determines that the candidate pictograph sequence includes a candidate identifier. The analysis engine 230 further determines that the candidate identifier matches a memory identifier, with the memory identifier included in the pictograph sequence stored on the memory.

At operation 450, responsive to the analysis engine 230 determining the candidate pictograph sequence matches a pictograph sequence stored on the memory, the display engine 250 transmits instructions to cause the display of the locked content to the first client device 110A. In an example embodiment, the display of the locked content may be transmitted over the network 104 and viewable as part of the client application 112 on a user interface on the first client device 110A. The display may further include selectable portions that allow access to features of the client application 112 or the social messaging system 130.

Continuing the above example, if a user wants to get access to locked content on the client application 112 on the first client device 110A, the user first submits a request to view the locked content, such as by making a selection on the client application 112. The communication engine 210 receives this request and the display engine 250 responds by transmitting instructions that cause a display of a pictograph keyboard to be shown on a user interface of the client device 110A. The user trying to access the locked content then selects pictographs from the pictograph keyboard in a sequence to form the candidate pictograph sequence. The communication engine 210 then receives the candidate pictograph sequence from the first client device 110A, and the analysis engine 230 compares the candidate pictograph sequence to a pictograph sequence stored on the memory. The analysis engine 230 determines that a candidate identifier included in the candidate pictograph sequence matches a memory identifier located on the pictograph sequence stored on the memory. The display engine then transmits instructions to cause a display of content that was previously locked to the user, such as features of the client application 112 that allow user to interact with other users, edit the user's profile, or send messages on the social messaging system 130.

Figure 5:
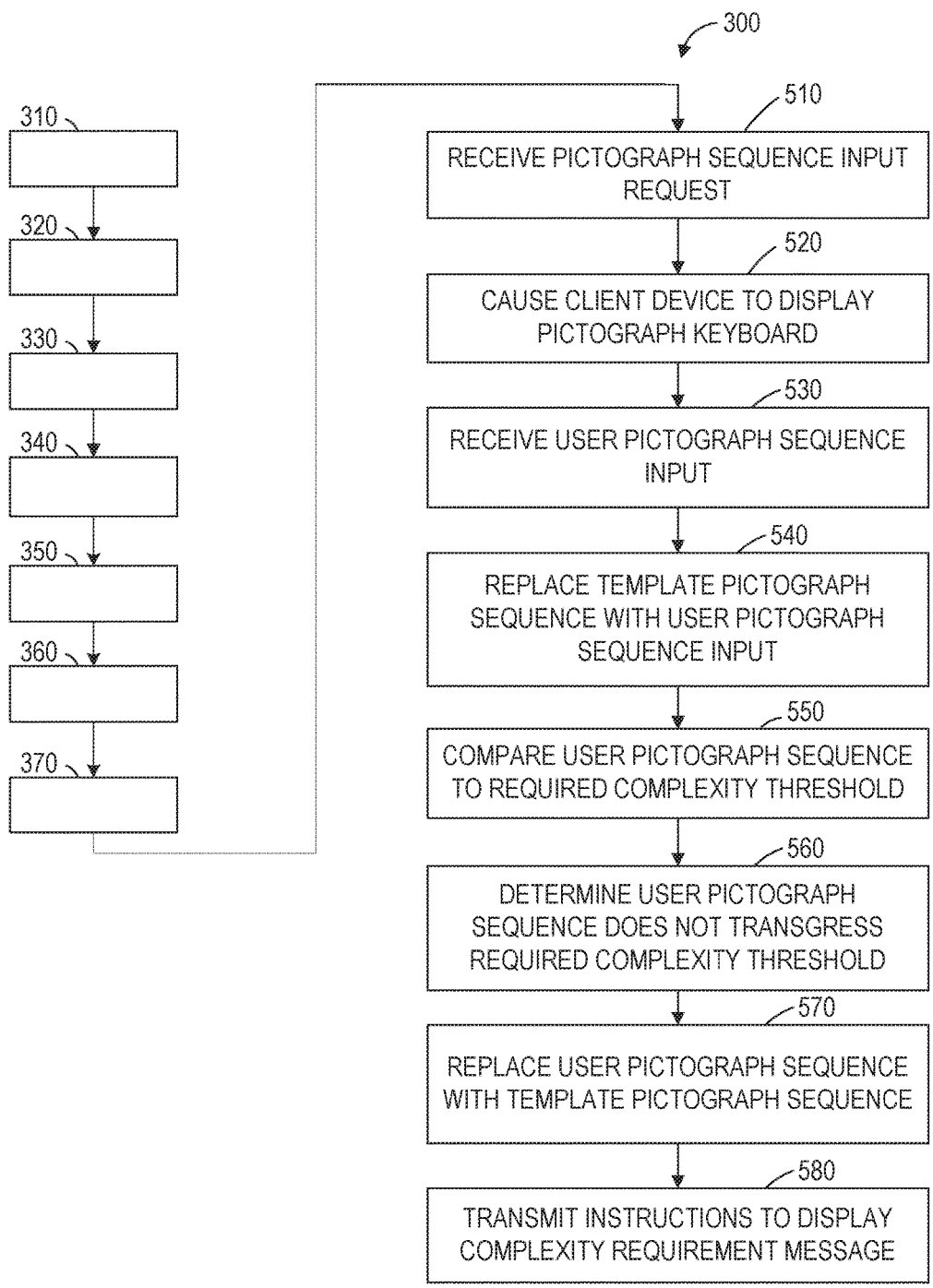
FIG. 5 is a flow diagram illustrating further example operations for generating a template pictograph sequence and association phrase, according to some example embodiments.

In some example embodiments, as shown in FIG. 5, operations 510-580 included in the method 300 may be performed as part (e.g., a precursor task, a subroutine, or a portion) of operation 370 of method 300, in which the display engine 250 displays on the template pictograph sequence and the association phrase on the client application 112 on the first client device 110A.

At operation 510, the communication engine 210 receives a pictograph sequence input request from the first client device 110A. Similar to above, the pictograph sequence request may be transmitted over the network 104 from the client application 112 and received by the communication engine 210 through the social messaging system 130. In an example embodiment, the first client device 110A sends the pictograph sequence and input request responsive to the first user 106 making a selection to replace the template pictograph sequence stored on the memory using a user interface on the client application 112.

Responsive to the communication engine 210 receiving pictograph sequence input request, the display engine 250 transmits instructions to cause the display of a pictograph keyboard that includes a plurality of pictographs. Similar to above, the display engine 250 transmits instructions to the client device 110A to cause the display of the pictograph keyboard over the network to the first client device 110A, with the display viewable on a user interface within the client application 112. Also similar to above, the pictographs displayed on the user interface may be selectable such that a user can construct a sequence of pictographs by selecting them in a particular order.

In some example embodiments, the user pictograph sequence input is a user combined sequence input wherein the user includes one or more alphanumeric symbols with the pictographs. In this embodiment, the display engine 250 transmits instructions to the client device 110A to display an alphanumeric keyboard in addition to the pictograph keyboard.

At operation 530, the communication engine 210 receives a user pictograph sequence input comprising the pattern of pictographs in a particular order. The user pictograph sequence input is constructed by receiving a selection of pictographs by the first user 106 interacting with the display of the pictograph keyboard on the client application 112. In an example embodiment, the sequence is transmitted over the network 104 and received by the communication engine 210 through the social messaging system 130.

At operation 540, the storage engine 240 replaces the template pictograph sequence that is stored on the memory with the user pictograph sequence input received by the communication engine 210. Thus, the user pictograph sequence input would be saved on the memory as a user pictograph sequence.

In an example, if a first user 106 is dissatisfied with the template pictograph sequence, then the first user 106 requests to change the template pictograph sequence and replaces it with the user pictograph sequence. Then, responsive to the first user 106 inputting a user pictograph sequence input using a pictograph keyboard displayed on the client application 112, the user pictograph sequence input would be stored on the memory in place of the template pictograph sequence. Similarly, if the first user 106 desires to change the user pictograph sequence that is currently stored on the memory, the first user 106 can request to change the user pictograph sequence and, using a similar method to above, input and store a second user pictograph sequence input in place of the first user pictograph sequence.

At operation 550 and 560, the analysis engine 230 may compare the user pictograph sequence to a minimum complexity threshold. A minimum complexity threshold may be transgressed by a pictograph sequence complying with a set of complexity rules that are stored on a database 138, with the rules indicating minimum constraints for a pictograph sequence to be stored on the memory by the storage engine 240. For example, there may be a rule that a user pictograph sequence may not include instances of the same pictograph. Additionally there may be a rule that a user pictograph sequence may not include only pictographs categorized as "facial emojis." At operation 560, responsive to the comparison between the user pictograph sequence and the complexity threshold, the analysis engine 230 determines that the user pictograph sequence does not transgress the complexity threshold and therefore does not comply with the set of complexity rules stored on the database 138.

At operation 570, responsive to the analysis engine 230 determining that the user pictograph sequence does not transgress the complexity threshold, the storage engine 240 replaces the user pictograph sequence with the template pictograph sequence. This in effect reverts the pictograph sequence stored on the memory back to the original sequence stored before the communication engine 210 received the pictograph sequence input request from the first client device 110A.

At operation 580, responsive to the analysis engine 230 determining that the user pictograph sequence does not transgress the complexity threshold, the display engine 250 transmits instructions to cause a display that includes the complexity requirement message to the first client device 110A. In an example embodiment, the complexity requirement message is transmitted over the network 104 and viewable on a user interface included in the client application 112. The complexity requirement message includes a textual display viewable to the first user 106 that communicates the failure of the user pictograph sequence to meet a designated complexity. In an example embodiment, the first user 106 is prompted to submit a second pictograph sequence input request in order to have the opportunity to input a conforming user pictograph sequence input.

For example, the user pictograph sequence input received by the communication engine 210 stored on the memory by the storage engine 240 is a sequence of four of the same pictographs, in this case, "smiley face" emojis. The analysis engine 230 then compares the pictograph sequence of four "smiley face" emojis to the complexity threshold. In this case, the complexity threshold is not transgressed because a complexity rule stored on a database 138 provides that the user pictograph sequence should include no repeated pictographs. Responsive to the analysis engine determining that the user pictograph sequence does not transgress the complexity threshold, the storage engine 240 replaces the user pictograph sequence with the template pictograph sequence and the display engine 250 transmits instructions to cause a display of a complexity requirement message to the first client device 110A. The complexity requirement message states, in this example, "Sorry, this password requires more unique emojis. Please try again."

Figure 6:
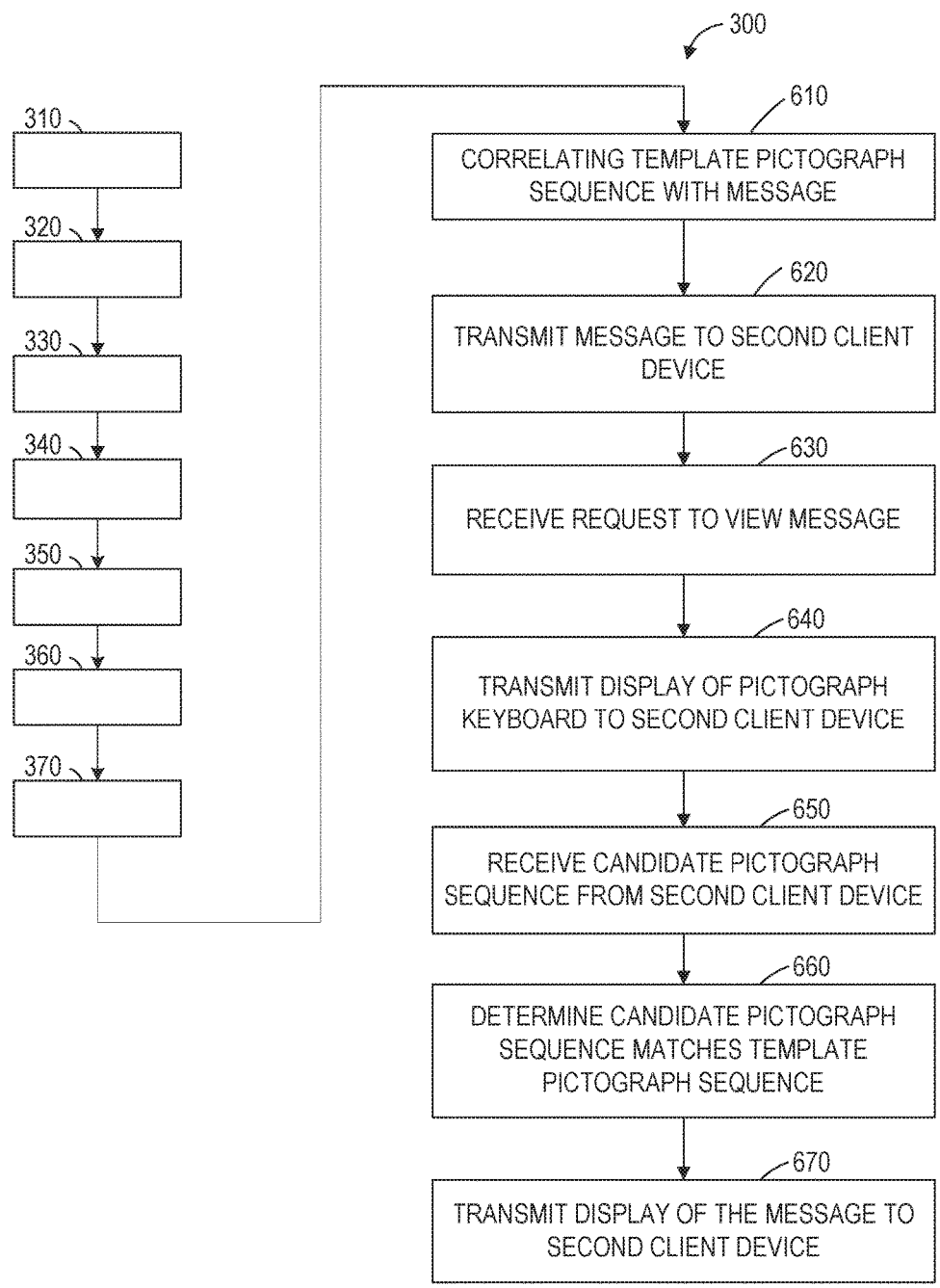
FIG. 6 is a flow diagram illustrating further example operations for generating a template pictograph sequence and association phrase, according to some example embodiments.

In some example embodiments, shown in FIG. 6, operations 610-670 included in the method 300 may be performed as part (e.g., a precursor task, a subroutine, or a portion) of operation 370 of method 300, in which the display engine 250 displays the template pictograph sequence and the association phrase on the client application 112 on the first client device 110A.

At operations 610-620, the communication engine 210 correlates the template pictograph sequence with a message from the first client device 110A and transmits the message to the second client device 110B. In an example embodiment, the message is received from the first client device 110A through a social messaging system 130. The message includes in the metadata of the message, an indication that the template pictograph sequence should be applied to the message when the message is delivered.

At operation 630, the communication engine 210 receives, from the second client device 110B, a request to view the message. For example the second user 108 may interact with a user interface on the second client device 110B to request to view the message transmitted by the communication engine 210.

At operations 640-650, responsive to the communication engine receiving the request to view the message from the second client device 110B, the display engine 250 transmits instructions to cause a display of a pictograph keyboard to the second client device 110B and the communication engine 210 receives a candidate pictograph sequence from the second client device 110B. Similar to above, the pictograph keyboard may include a plurality of selectable pictographs and allow the second user 108 to select a sequence of pictographs for submission as the candidate pictograph sequence.

At operations 660-670, in a method consistent with the preceding paragraphs, the analysis engine 230 determines whether the candidate pictograph sequence matches the template pictograph sequence that is stored on the memory, and responsive to the analysis engine 230 determining the candidate pictograph sequence matches the template pictograph sequence, the display engine 250 transmits instructions to cause a display of the message to the second client device 110B. The message may be viewable on a user interface of the second client device 110B and using the client application 112.

Figure 7:
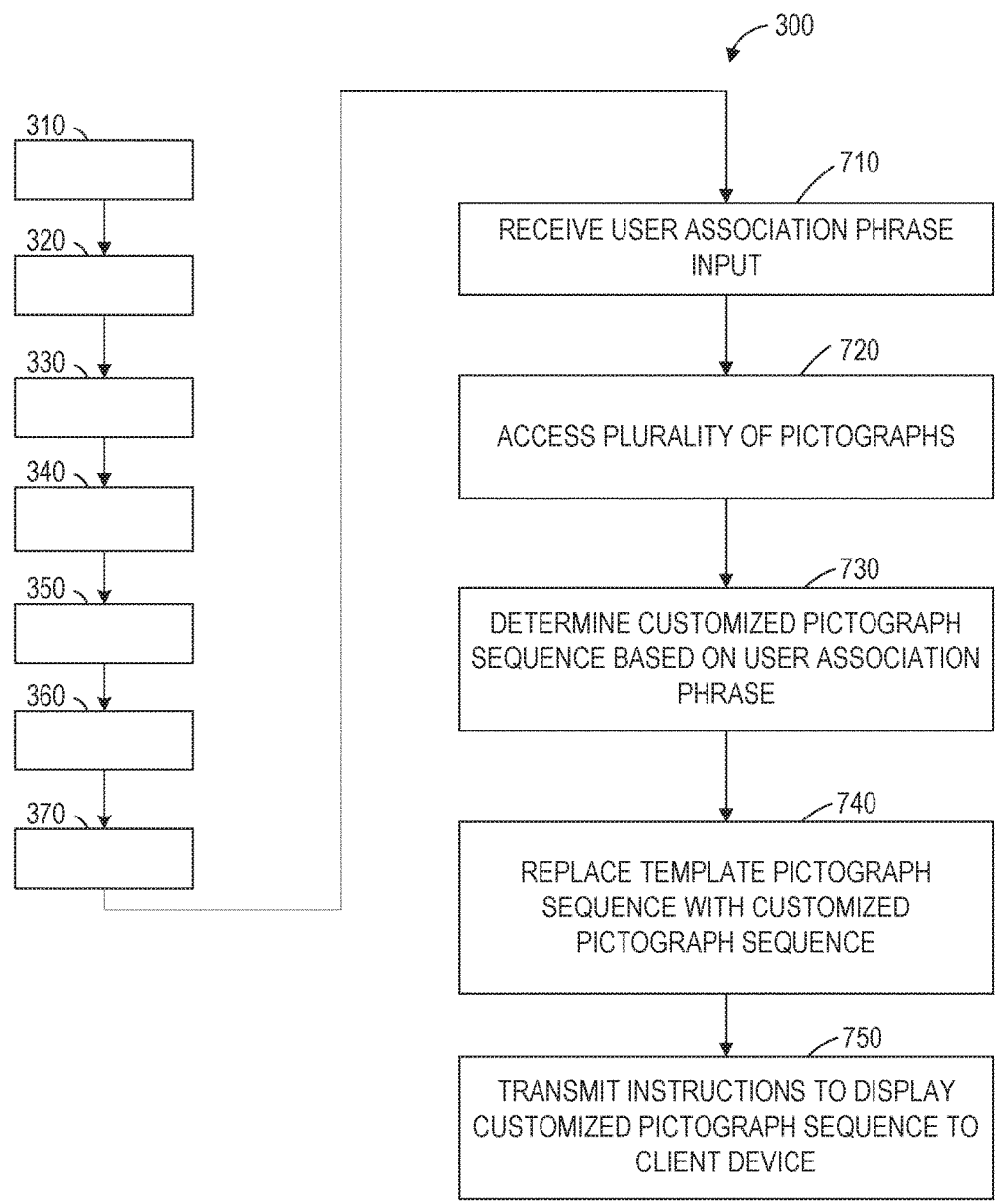
FIG. 7 is a flow diagram illustrating further example operations for generating a template pictograph sequence and association phrase, according to some example embodiments.

In some example embodiments, shown in FIG. 7, operations 710-750 included in the method 300 may be performed as part (e.g., a precursor task, a subroutine, or a portion) of operation 370 of method 300, in which the display engine 250 displays the template pictograph sequence and the association phrase on the client application 112 on the first client device 110A.

At operation 710, the communication engine 210 receives an association phrase input from the first client device 110A. The association phrase input may be communicated from the first user 106 using a user interface on the client application 112 running on the first client device 110A. The association phrase may comprise a sequence of words that the first user desires the pictograph password security system to associate with pictographs.

At operations 720-730, the communication engine 210 accesses the pictograph database 134 that contains a plurality of pictographs and aggregates pictographs that are associated with words or phrases within the association phrase input. Similar to examples above, the semantic engine 220 can generate a pictograph sequence by selecting pictographs related to the words or phrases within the association phrase input and further based on the order of the words or phrases in the association phrase.

At operations 740-750, responsive to the generation of the customized pictograph sequence by the semantic engine 220, the storage engine 240 replaces the template pictograph sequence with the customized pictograph sequence. Also similar to examples above, the display engine 250 transmits instructions to cause a display of the customized pictograph sequence to the first client device 110A that is viewable on a user interface within the client application 112.

Figure 8:
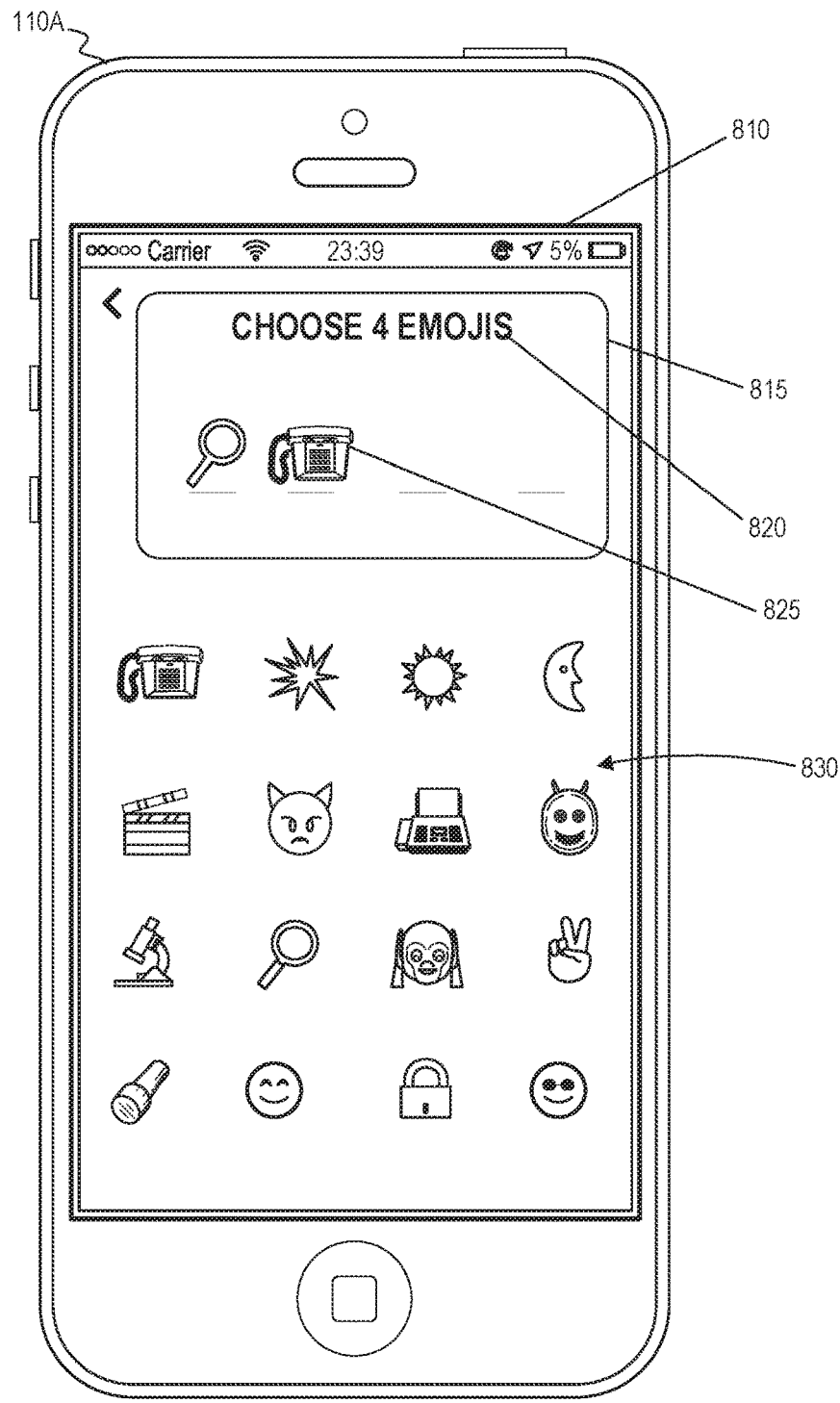
FIGS. 8-10 are diagrams illustrating an example of a graphical user interface that is configured to display pictograph password sequences and association phrases within a client application in accordance with some embodiments.
Figure 9:
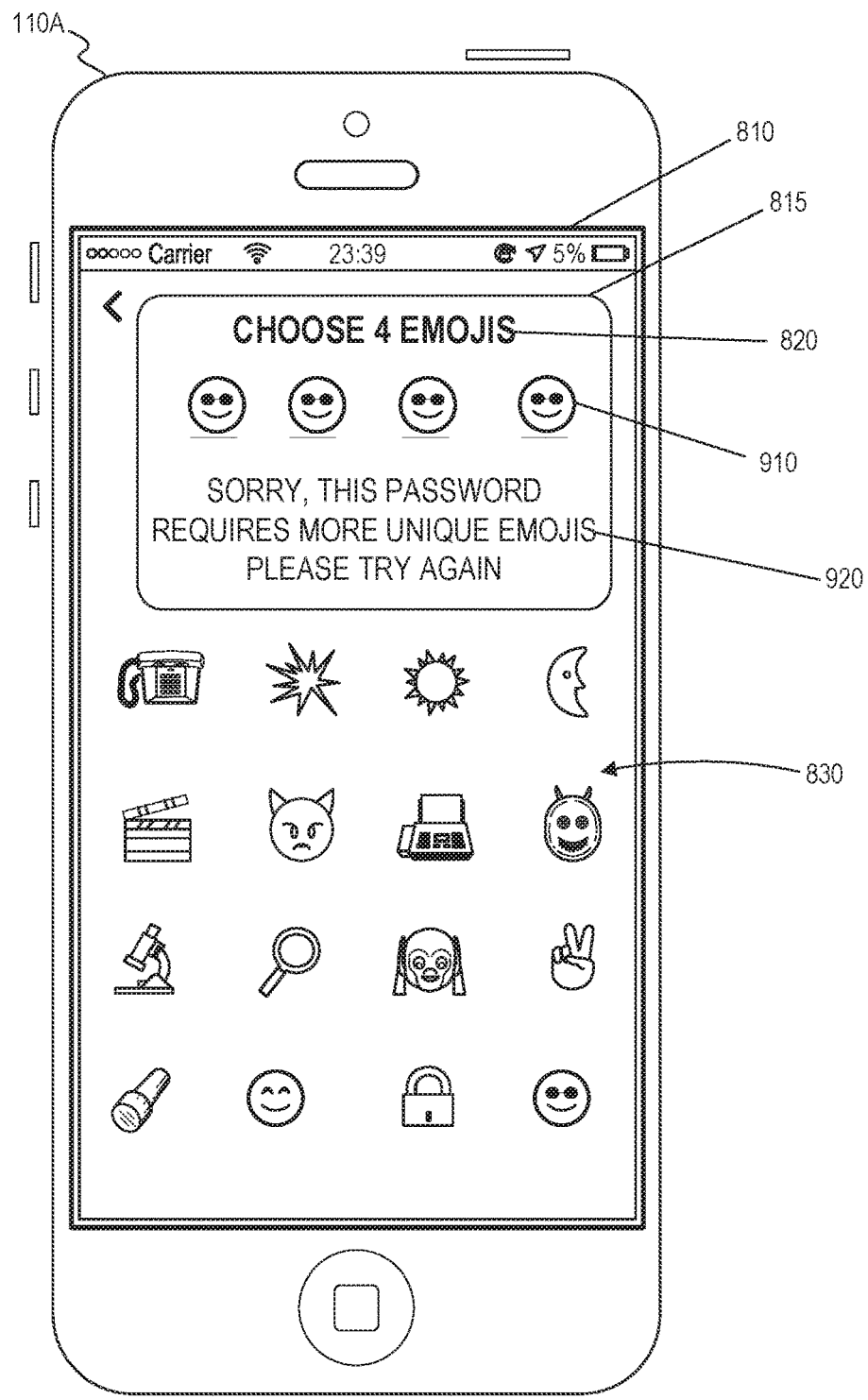
Figure 10:
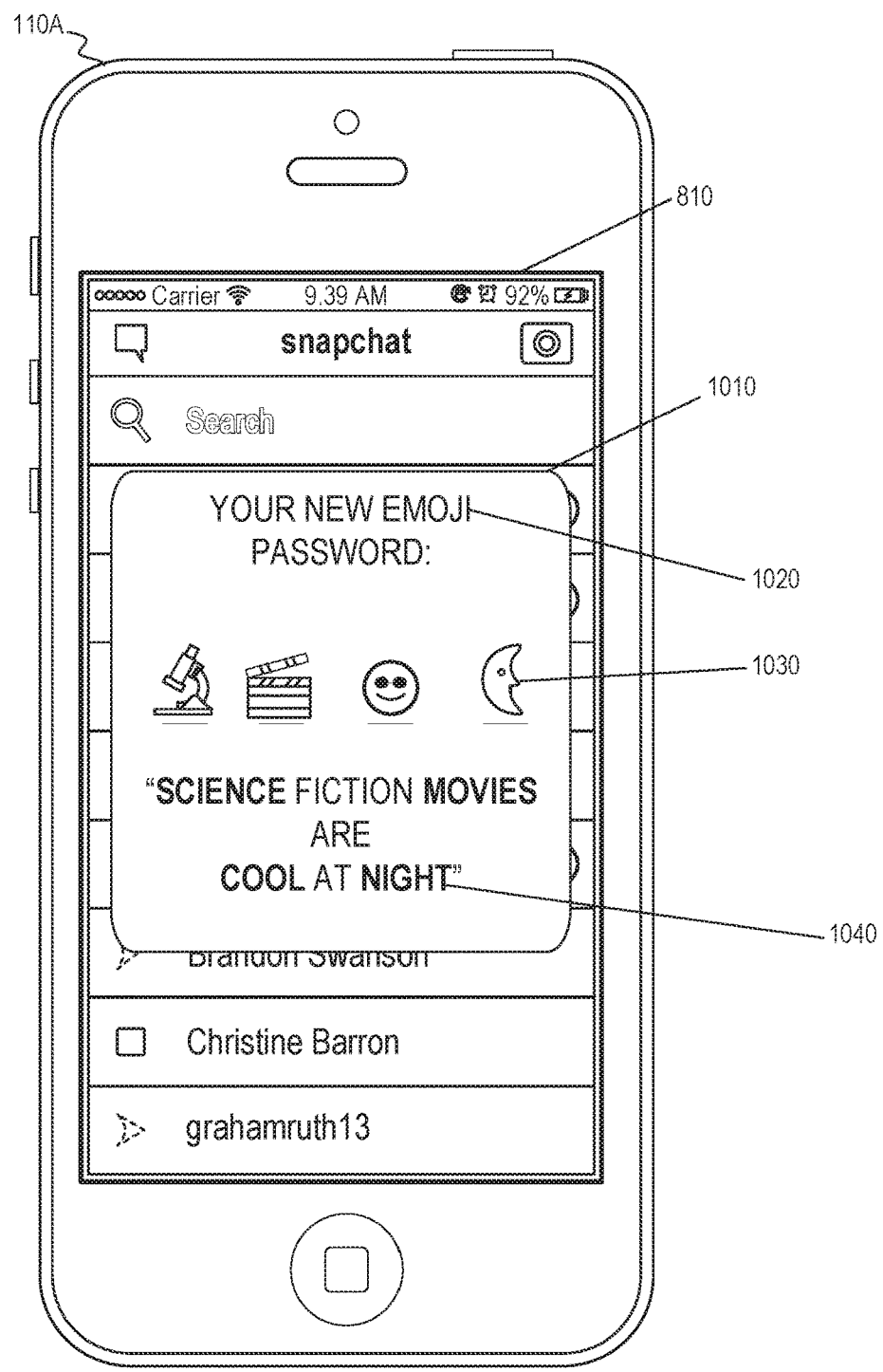

FIGS. 8-10 are interface diagrams that display the client application 112 running on the first client device 110A. The first client device 110A includes a user interface that is a graphic user interface 810 that displays the client application 112. The graphic user interface 810 includes a pictograph keyboard 830 transmitted by the display engine 250 with a plurality of pictographs displayed. This representation on the graphic user interface 810 allows first user 106 to select pictographs from the pictograph keyboard 830 in a specific sequence. Additionally, instructions to display pictograph display window 815 are transmitted by the display engine 250 and displayed on the graphic user interface 810. Additionally, the display window includes an instruction message 820, such as "Choose 4 Emojis," and a display of pictographs 825 that have been selected by the first user 106. In the example depicted the user has selected two pictographs, the magnifying glass pictograph and telephone pictograph from the pictographs displayed on the pictograph keyboard 830 and are now displayed on the pictograph display window 815.

FIG. 9 shows the graphic user interface 810, the pictograph keyboard 830 with a plurality of pictographs transmitted by the display engine 250, and the pictograph display window 815 transmitted using the display engine 250 in another example. In this example, the notification window shows both the instruction message 820 and a notification message 920, with the notification message stating, "sorry, this password requires more unique emojis, please try again." This message is presented to the first user 106 on the graphic user interface 810 responsive to the analysis engine 230 determining that the user pictograph sequence 910 (in this case, four smile emojis with sunglasses) does not transgress the complexity score that would allow the storage engine 240 to store the user pictograph sequence on the memory.

FIG. 10 shows the graphic user interface 810 including a template sequence display window 1010 transmitted by the display engine 250. Included on the template sequence display window are a template notification message 1020 stating "your new emoji password," a display of the template pictograph sequence 1030 generated by the semantic engine 220, and a display of the association phrase 1040 generated by the semantic engine 220 and stating "science fiction movies are cool at night." In the example, the semantic engine 220 randomly selected a pictograph of a microscope, a pictograph of the clapperboard, a pictograph of the sunglass smiley face, and the moon pictograph from the pictograph database 134 and, based on the pictographs and the order of the pictographs, constructed an association phrase with words and phrases from the text database 136.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Any one of the aforementioned modules or another added module may operate as a pictograph password security system and employ one or more operations of the pictograph password security system 160 described herein. Additionally, the pictograph password security system 160 may operate in concert with the aforementioned modules or independently.

Software Architecture

Figure 11:
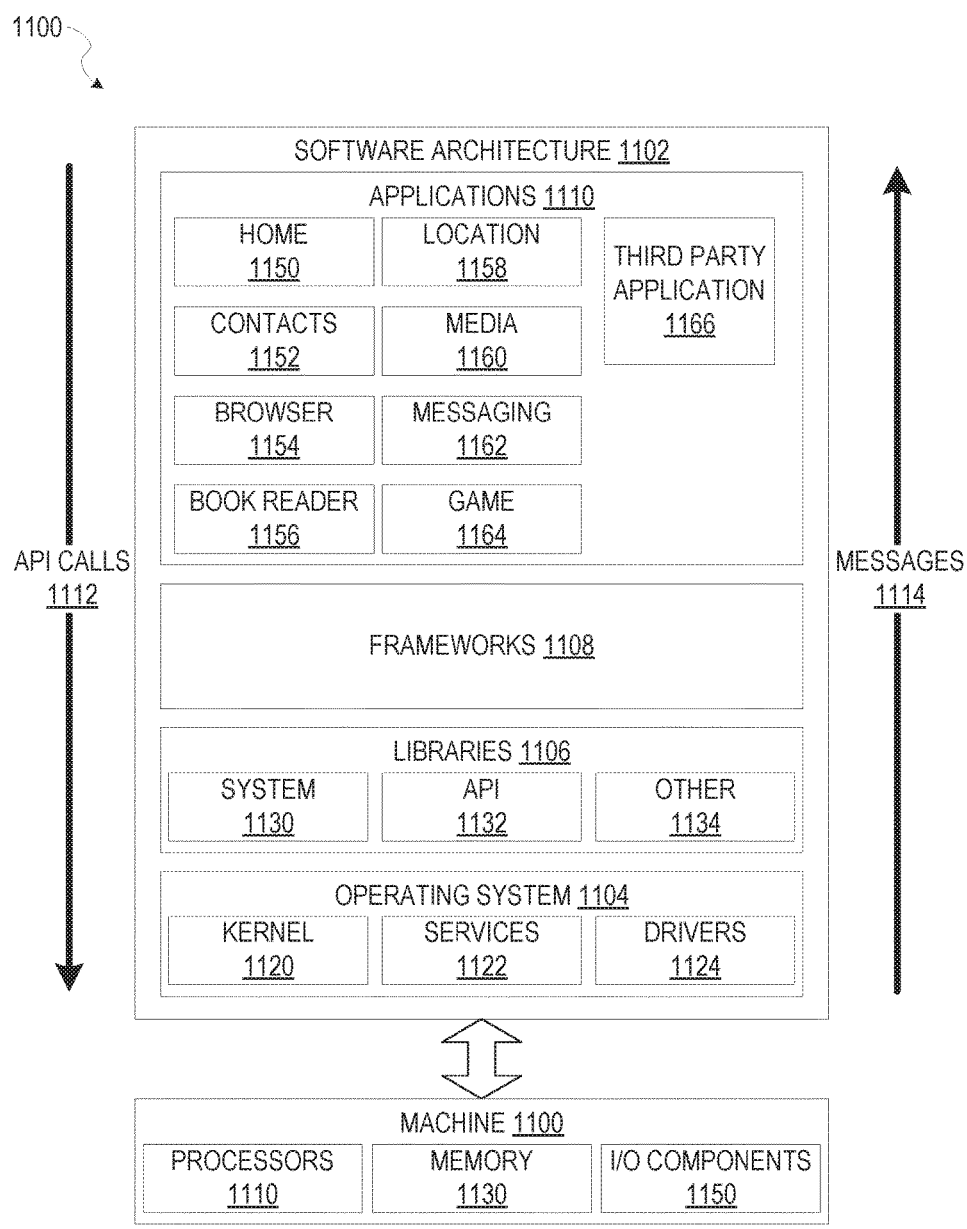
FIG. 11 is a block diagram illustrating an example of a software architecture that may be installed on a machine, according to some example embodiments.

FIG. 11 is a block diagram 1100 illustrating an architecture of software 1102, which can be installed on any one or more of the devices described above. FIG. 11 is merely a non-limiting example of a software architecture, and it will be appreciated that many other architectures can be implemented to facilitate the functionality described herein. In various embodiments, the software 1102 is implemented by hardware such as a machine 1200 of FIG. 12 that includes processors 1210, memory 1230, and I/O components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third party application 1166 can invoke the API calls 1112 provided by the operating system 1104 to facilitate functionality described herein.

Example Machine Architecture and Machine-Readable Medium

Figure 12:
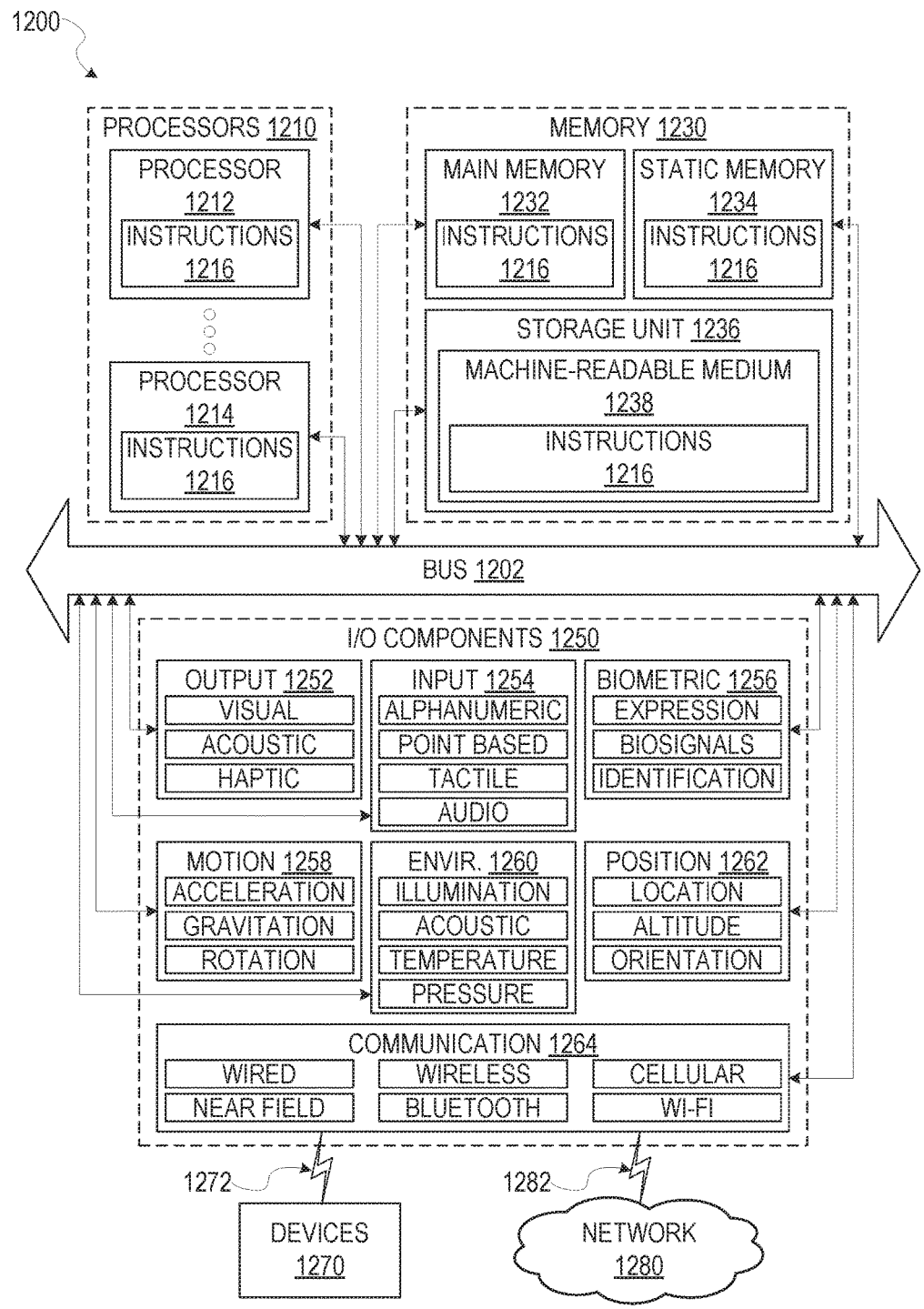
FIG. 12 is a block diagram presenting a diagrammatic representation of a machine in the form of a computer system within which a set of instructions may be executed for causing the machine to perform any of the methodologies discussed herein, according to an example embodiment.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) include, for example, a processor 1212 and a processor 1214 that may execute the instructions 1216. The term "processor" is intended to include multi-core processors that may comprise two or more independent processors (also referred to as "cores") that can execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., an accelerometer), gravitation sensor components, rotation sensor components (e.g., a gyroscope), and so forth. The environmental components 1260 include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a USB).

Moreover, in some embodiments, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., HTTP). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium should be considered as being transportable from one physical location to another. Additionally, since the machine-readable medium 1238 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising: receiving, at a server computer, an assigned pictograph sequence request from a client device; accessing, by one or more processors of the server computer, a first data structure that contains a plurality of pictographs that are displayable on the client device; generating, using the one or more processors, a template pictograph sequence that includes at least two pictographs from the first data structure; accessing, by the one or more processors, a second data structure that contains words and phrases that are associated with the pictographs contained in the first data structure; determining, by the one or more processors, an association phrase for the template pictograph sequence, the association phrase based on the words and phrases associated with pictographs within the template pictograph sequence and based on an order of pictographs within the template pictograph sequence, the association phrase being determined at least in part by selecting, based on a second pictograph of the at least two pictographs, at least one of the words and phrases associated with a first pictograph of the at least two pictographs as a first word or phrase of the association phrase; computing a first coherency metric representing a first coherency between the selected at least one of the words and phrases associated with the first pictograph and a first of at least one of the words and phrases associated with the second pictograph; computing a second coherency metric representing a second coherency between the selected at least one of the words and phrases associated with the first pictograph and a second of the at least one of the words and phrases associated with the second pictograph; and in response to determining that the second coherency metric is greater than the first coherency metric, selecting the second of the at least one of the words and phrases associated with the second pictograph as a second word or phrase of the of the association phrase; storing the template pictograph sequence on a memory; and transmitting instructions that cause a display of the pictograph sequence and the association phrase to the client device, the display presentable within a user interface.

2. The method of claim 1, further comprising:
receiving a request to view locked content from the client device,
transmitting instructions that cause a display of a pictograph keyboard on the client device, the pictograph keyboard including pictographs also included in the first data structure;
receiving a candidate pictograph sequence from the client device, the candidate pictograph sequence including at least one pictograph selected from the pictograph keyboard;
determining that the candidate pictograph sequence matches a pictograph sequence stored on the memory; and
responsive to the candidate pictograph sequence matching the pictograph sequence stored on the memory, transmitting instructions that cause a display of the locked content on the client device.

3. The method of claim 1, further comprising:
receiving a pictograph sequence input request from the client device;
transmitting instructions that cause a display of a pictograph keyboard to the client device, the pictograph keyboard including pictographs also included in the first data structure;
receiving a user pictograph sequence input from the client device; and
replacing the template pictograph sequence stored on the memory with the user pictograph sequence.

4. The method of claim 3, further comprising:
comparing the user pictograph sequence to a minimum complexity threshold stored on the memory;
determining the user pictograph sequence does not transgress the minimum complexity threshold;
replacing the user pictograph sequence stored on the memory with the template pictograph sequence; and
transmitting instructions that cause a display of a notification window that includes a complexity requirement message to the client device.

5. The method of claim 1, wherein the client device is a first client device, and further comprising:
correlating the template pictograph sequence with a message;
transmitting the message to a second client device;
receiving a request to view the message from the second client device;
transmitting instructions that cause a display of a pictograph keyboard to the second client device, the pictograph keyboard including pictographs also included in the first data structure;
receiving a candidate pictograph sequence from the second client device, the candidate pictograph sequence including at least one pictograph selected from the pictograph keyboard;
determining that the candidate pictograph sequence matches the template pictograph sequence; and
responsive to the candidate pictograph sequence matching the template pictograph sequence, transmitting instructions that cause a display of the message to the second client device.

6. The method of claim 5, wherein the message is an ephemeral message associated with a message deletion trigger.

7. The method of claim 1, further comprising:
receiving a user association phrase input,
accessing the first data structure that contains the plurality of pictographs that are displayable on the client device and accessing the second data structure that contains words and phrases that are associated with the pictographs contained in the first data structure;
determining a customized pictograph sequence based on the pictographs associated with the user association phrase, the customized pictograph sequence based on the words, and phrases within the user association phrase input and based on the order of the words and phrases within the user association phrase input;
replacing the template pictograph sequence stored on the memory with the customized pictograph sequence; and
transmitting instructions that cause a display of the customized pictograph sequence to the client device, the display presentable within the user interface.

8. The method of claim 1, wherein the template pictograph sequence is a first template pictograph sequence and the association phrase is a first association phrase and further comprising:
receiving a replacement pictograph sequence request from the client device;
accessing the first data structure that contains an array of pictographs that are displayable on the client device;
generating a second template pictograph sequence that includes at least one pictograph from the first data structure;
accessing the second data structure that contains words and phrases that are associated with the pictographs contained in the first data structure;
determining a second association phrase to the pictograph sequence, the association phrase based on the words and phrases associated with pictographs within the second template pictograph sequence and based on the order of pictographs within the second template pictograph sequence;
replacing the first template pictograph sequence stored on the memory with the second pictograph sequence; and
transmitting instructions that cause a display of the second pictograph sequence and the second association phrase to the client device, the display presentable within the user interface.

9. The method of claim 1, wherein the template pictograph sequence is associated with a deletion trigger based on a deletion threshold, and further comprising:
determining the deletion threshold has been transgressed; and
removing the template pictograph sequence from the memory.

10. A system comprising: one or more processors of a machine; and a memory storing instructions that, when executed by the one or more processors, causes the machine to perform operations comprising: receiving, at a server computer, an assigned pictograph sequence request from a client device; accessing, by one or more processors of the server computer, a first data structure that contains a plurality of pictographs that are displayable on the client device; generating, using the one or more processors, a template pictograph sequence that includes at least two pictographs from the first data structure; accessing, by the one or more processors, a second data structure that contains words and phrases that are associated with the pictographs contained in the first data structure; determining, by the one or more processors, an association phrase for the pictograph sequence, the association phrase based on the words and phrases associated with pictographs within the template pictograph sequence and based on an order of pictographs within the template pictograph sequence, the association phrase being determined at least in part by selecting, based on a second pictograph of the at least two pictographs, at least one of the words and phrases associated with a first pictograph of the at least two pictographs as a first word or phrase of the association phrase; computing a second coherency metric representing a second coherency between the selected at least one of the words and phrases associated with the first pictograph and a second of the at least one of the words and phrases associated with the second pictograph; and in response to determining that the second coherency metric is greater than the first coherency metric, selecting the second of the at least one of the words and phrases associated with the second pictograph as a second word or phrase of the of the association phrase; storing the template pictograph sequence on a memory; and transmitting instructions that cause a display of the pictograph sequence and the association phrase to the client device, the display presentable within a user interface.

11. The system of claim 10, wherein the operations further comprise:
receiving a request to view locked content from the client device;
transmitting instructions that cause a display of a pictograph keyboard on the client device, the pictograph keyboard including pictographs also included in the first data structure;
receiving a candidate pictograph sequence from the client device, the candidate pictograph sequence including at least one pictograph selected from the pictograph keyboard;
determining that the candidate pictograph sequence matches a pictograph sequence stored on the memory; and
responsive to the candidate pictograph sequence matching the pictograph sequence stored on the memory, transmitting instructions that cause a display of the locked content on the client device.

12. The system of claim 10, wherein the operations further comprise:
receiving a pictograph sequence input request from the client device;
transmitting instructions that cause a display of a pictograph keyboard to the client device, the pictograph keyboard including pictographs also included in the first data structure;
receiving a user pictograph sequence input from the client device; and
replacing the template pictograph sequence stored on the memory with the user pictograph sequence.

13. The system of claim 10, wherein the operations further comprise:
comparing the user pictograph sequence to a minimum complexity threshold stored on the memory;
determining the user pictograph sequence does not transgress the minimum complexity threshold;
replacing the user pictograph sequence stored on the memory with the template pictograph sequence; and
transmitting instructions that cause a display of a notification window that includes a complexity requirement message to the client device.

14. The system of claim 10, wherein the client device is a first client device, and wherein the operations further comprise:
correlating the template pictograph sequence with a message;
transmitting the message to a second client device;
receiving a request to view the message from the second client device;
transmitting instructions that cause a display of a pictograph keyboard to the second client device, the pictograph keyboard including pictographs also included in the first data structure;
receiving a candidate pictograph sequence from the second client device, the candidate pictograph sequence including at least one pictograph selected from the pictograph keyboard;
determining that the candidate pictograph sequence matches the template pictograph sequence; and
responsive to the candidate pictograph sequence matching the template pictograph sequence, transmitting instructions that cause a display of the message to the second client device.

15. The system of claim 14, wherein the message is an ephemeral message associated with a message deletion trigger.

16. The system of claim 10, wherein the operations further comprise:
receiving a user association phrase input;
accessing the first data structure that contains the plurality of pictographs that are displayable on the client device and accessing the second data structure that contains words and phrases that are associated with the pictographs contained in the first data structure;
determining a customized pictograph sequence based on the pictographs associated with the user association phrase, the customized pictograph sequence based on the words, and phrases within the user association phrase input and based on the order of the words and phrases within the user association phrase input;
replacing the template pictograph sequence stored on the memory with the customized pictograph sequence; and
transmitting instructions that cause a display of the customized pictograph sequence to the client device, the display presentable within the user interface.

17. The system of claim 10, wherein the template pictograph sequence is a first template pictograph sequence and the association phrase is a first association phrase; and
wherein the operations further comprise:
receiving a replacement pictograph sequence request from the client device;
accessing the first data structure that contains an array of pictographs that are displayable on the client device;
generating a second template pictograph sequence that includes at least one pictograph from the first data structure;
accessing the second data structure that contains words and phrases that are associated with the pictographs contained in the first data structure;
determining a second association phrase to the pictograph sequence, the association phrase based on the words and phrases associated with pictographs within the second template pictograph sequence and based on the order of pictographs within the second template pictograph sequence;
replacing the first template pictograph sequence stored on the memory with the second pictograph sequence; and
transmitting instructions that cause a display of the second pictograph sequence and the second association phrase to the client device, the display presentable within the user interface.

18. The system of claim 10, wherein the template pictograph sequence is associated with a deletion trigger based on a deletion threshold, and wherein operations further comprise:
determining the deletion threshold has been transgressed; and
removing the template pictograph sequence from the memory.

19. A non-transitory machine-readable storage medium comprising instructions that, when executed by one or more processors of a machine, cause the machine to perform operations comprising: receiving, at a server computer, an assigned pictograph sequence request from a client device; accessing, by one or more processors of the server computer, a first data structure that contains a plurality of pictographs that are displayable on the client device; generating, using the one or more processors, a template pictograph sequence that includes at least two pictographs from the first data structure; accessing, by the one or more processors, a second data structure that contains words and phrases that are associated with the pictographs contained in the first data structure; determining, by the one or more processors, an association phrase for the pictograph sequence, the association phrase based on the words and phrases associated with pictographs within the template pictograph sequence and based on an order of pictographs within the template pictograph sequence, the association phrase being determined at least in part by selecting, based on a second pictograph of the at least two pictographs, at least one of the words and phrases associated with a first pictograph of the at least two pictographs as a first word or phrase of the association phrase; wherein the operations further comprise: computing a first coherency metric representing a first coherency between the selected at least one of the words and phrases associated with the first pictograph and a first of at least one of the words and phrases associated with the second pictograph; computing a second coherency metric representing a second coherency between the selected at least one of the words and phrases associated with the first pictograph and a second of the at least one of the words and phrases associated with the second pictograph; and in response to determining that the second coherency metric is greater than the first coherency metric, selecting the second of the at least one of the words and phrases associated with the second pictograph as a second word or phrase of the of the association phrase; storing the template pictograph sequence on a memory; and transmitting instructions that cause a display of the pictograph sequence and the association phrase to the client device, the display presentable within a user interface.

20. The non-transitory machine-readable storage medium of claim 19, wherein the operations further comprise:
receiving a request to view locked content from the client device,
transmitting instructions that cause a display of a pictograph keyboard on the client device, the pictograph keyboard including pictographs also included in the first data structure;
receiving a candidate pictograph sequence from the client device, the candidate pictograph sequence including at least one pictograph selected from the pictograph keyboard;
determining that the candidate pictograph sequence matches a pictograph sequence stored on the memory; and responsive to the candidate pictograph sequence matching the pictograph sequence stored on the memory, transmitting instructions that cause a display of the locked content on the client device.

\* \* \* \* \*

UNITED STATES PATENT AND TRADEMARK OFFICE
CERTIFICATE OF CORRECTION

PATENT NO. : 10,182,047 B1
APPLICATION NO. : 15/199463
DATED : January 15, 2019
INVENTOR(S) : Buehl et al.

It is certified that error appears in the above-identified patent and that said Letters Patent is hereby corrected as shown below:

In the Claims

In Column 22, Line 47, in Claim 1, delete "of the of the" and insert --of the-- therefor In Column 22, Line 54, in Claim 2, delete "device," and insert --device;-- therefor In Column 23, Line 51, in Claim 7, delete "input," and insert --input;-- therefor In Column 24, Line 66, in Claim 10, delete "of the of the" and insert --of the-- therefor In Column 25, Line 7, in Claim 11, delete "device," and insert --device;-- therefor In Column 28, Line 1, in Claim 19, delete "of the of the" and insert --of the-- therefor In Column 28, Line 9, in Claim 20, delete "device," and insert --device;-- therefor Signed and Sealed this
Thirtieth Day of July, 2019

Andrei Iancu
*Director of the United States Patent and Trademark Office*